United States Patent
Kim

(10) Patent No.: US 10,621,980 B2
(45) Date of Patent: Apr. 14, 2020

(54) EXECUTION OF VOICE COMMANDS IN A MULTI-DEVICE SYSTEM

(71) Applicant: Harman International Industries, Inc., Stamford, CT (US)

(72) Inventor: Seon Man Kim, Palo Alto, CA (US)

(73) Assignee: Harman International Industries, Inc., Stamford, CT (US)

( * ) Notice: Subject to any disclaimer, the term of this patent is extended or adjusted under 35 U.S.C. 154(b) by 0 days.

(21) Appl. No.: 15/465,372

(22) Filed: Mar. 21, 2017

(65) Prior Publication Data
US 2018/0277107 A1 Sep. 27, 2018

(51) Int. Cl.
*G10L 15/22* (2006.01)
*G10L 25/51* (2013.01)
(Continued)

(52) U.S. Cl.
CPC .............. *G10L 15/22* (2013.01); *G10L 15/04* (2013.01); *G10L 15/28* (2013.01); *G10L 25/21* (2013.01);
(Continued)

(58) Field of Classification Search
CPC . G10L 2021/02166; G10L 2021/02087; G10L 2021/02163; G10L 2021/03643; G10L 2025/937; G10L 21/0232; G10L 25/18; G10L 2015/226; G10L 21/0208; G10L 21/0216; G10L 21/028; G10L 25/21; G10L 25/84; G10L 15/22; G10L 15/28; G10L 15/04; G10L 25/51; G10L 2015/223; G10L 15/26; G10L 2015/225; G06F 1/1688; G06F 1/1694; G06F 1/1684; G06F 2200/1637; G06F 3/011; G06F 3/165; G06F 19/3487; G06F 1/1616; G06F 1/163;
(Continued)

(56) References Cited

U.S. PATENT DOCUMENTS

| 4,829,578 A | * | 5/1989 | Roberts | ................... G10L 15/20 704/233 |
| 8,345,900 B2 | * | 1/2013 | Marquis | ............... H04R 25/405 381/312 |

(Continued)

OTHER PUBLICATIONS

Extended European Search Report for Application No. 18158279.2 dated Jul. 19, 2018.

*Primary Examiner* — Abdelali Serrou
(74) *Attorney, Agent, or Firm* — Artegis Law Group, LLP

(57) ABSTRACT

Performing speech recognition in a multi-device system includes receiving a first audio signal that is generated by a first microphone in response to a verbal utterance, and a second audio signal that is generated by a second microphone in response to the verbal utterance; dividing the first audio signal into a first sequence of temporal segments; dividing the second audio signal into a second sequence of temporal segments; comparing a sound energy level associated with a first temporal segment of the first sequence to a sound energy level associated with a first temporal segment of the second sequence; based on the comparing, selecting, as a first temporal segment of a speech recognition audio signal, one of the first temporal segment of the first sequence and the first temporal segment of the second sequence; and performing speech recognition on the speech recognition audio signal.

20 Claims, 13 Drawing Sheets

(51) Int. Cl.
*G10L 15/04* (2013.01)
*G10L 25/21* (2013.01)
*G10L 15/28* (2013.01)

(52) U.S. Cl.
CPC ........ *G10L 25/51* (2013.01); *G10L 2015/223* (2013.01)

(58) Field of Classification Search
CPC ........... G06F 1/1686; G06F 2200/1636; G06F 3/0433; G06F 3/04883; G06F 3/167
See application file for complete search history.

(56) References Cited

U.S. PATENT DOCUMENTS

| | | | | |
|---|---|---|---|---|
| 8,503,694 | B2* | 8/2013 | Tashev | H04B 1/036 381/94.1 |
| 9,009,048 | B2* | 4/2015 | Jang | G10L 15/04 704/211 |
| 9,406,313 | B2* | 8/2016 | Ryan | G10L 25/78 |
| 9,729,821 | B1* | 8/2017 | Fineberg | H04N 7/148 |
| 9,769,563 | B2* | 9/2017 | Kirsch | H04M 3/568 |
| 9,775,998 | B2* | 10/2017 | Fredelake | H04R 25/305 |
| 2004/0181402 | A1* | 9/2004 | Bartkowiak | G10L 25/78 704/226 |
| 2005/0135431 | A1* | 6/2005 | Lam | H04Q 1/46 370/526 |
| 2008/0039964 | A1 | 2/2008 | Charoenruengkit et al. | |
| 2009/0323977 | A1* | 12/2009 | Kobayashi | H04R 1/406 381/71.8 |
| 2010/0211387 | A1* | 8/2010 | Chen | G10L 25/78 704/226 |
| 2011/0044481 | A1* | 2/2011 | Marquis | H04R 25/405 381/313 |
| 2012/0101809 | A1* | 4/2012 | Kennewick | G06Q 30/0261 704/9 |
| 2012/0224456 | A1* | 9/2012 | Visser | G01S 3/8006 367/127 |
| 2013/0022216 | A1* | 1/2013 | Ganong, III | H04M 3/569 381/92 |
| 2013/0051577 | A1* | 2/2013 | Morcelli | H04R 3/005 381/92 |
| 2013/0070928 | A1* | 3/2013 | Ellis | H04R 25/30 381/56 |
| 2014/0037111 | A1* | 2/2014 | Uhle | H04H 60/04 381/119 |
| 2015/0162006 | A1* | 6/2015 | Kummer | G07C 9/00571 704/275 |
| 2015/0228274 | A1 | 8/2015 | Leppänen et al. | |
| 2015/0358730 | A1* | 12/2015 | Kirsch | H04R 3/002 381/71.1 |
| 2015/0380010 | A1* | 12/2015 | Srinivasan | H04R 1/406 704/227 |
| 2016/0104483 | A1 | 4/2016 | Foerster et al. | |
| 2016/0236690 | A1* | 8/2016 | Juneja | G06F 3/16 |
| 2016/0284364 | A1* | 9/2016 | Maouche | G10L 25/84 |
| 2016/0300571 | A1* | 10/2016 | Foerster | G10L 15/02 |
| 2017/0142533 | A1* | 5/2017 | Park | H04R 27/00 |
| 2017/0332168 | A1* | 11/2017 | Moghimi | H04R 3/005 |
| 2018/0091913 | A1* | 3/2018 | Hartung | H04R 29/007 |
| 2018/0146212 | A1* | 5/2018 | Hensler | G06T 7/11 |

* cited by examiner

EXECUTION OF VOICE COMMANDS IN A MULTI-DEVICE SYSTEM

BACKGROUND

Field of the Claimed Embodiments

Embodiments of the present invention relate generally to a speech processing device and, more specifically, to execution of voice commands in a multi-device system.

Description of the Related Art

Speech recognition software has become widely used in recent years, particularly because mobile computing devices, such as smartphones, electronic tablets, etc., typically are equipped with microphones and powerful processors. For example, numerous speech-to-text software applications have been developed that can interpret a recorded audio representation of a spoken utterance and generate a corresponding text representation of the spoken utterance. When used in conjunction with a suitably equipped computing device, such software enables a user to submit text to a software application by uttering a word or phrase into a microphone of the computing device. One example of such software is an intelligent personal assistant (IPA).

An IPA is a software agent or other application that can perform tasks or services for a user based on verbal input provided by the user. Examples of IPAs include Microsoft Cortana™, Apple Siri™, Google Home™, and Amazon Alexa™. An IPA implemented in a computing device can enable certain tasks to be performed for a user based on spoken requests, thereby circumventing the need for the user to provide manual input via a touchscreen, keyboard, mouse, or other input device. For example, information can be accessed for a user from a variety of online sources via the IPA (e.g., weather, traffic conditions, news, stock prices, user schedules, retail prices, etc.). Further, information-based tasks can be completed for the user by the IPA (e.g., management of emails, calendar events, files, to-do lists, and the like).

However, as the use of IPA-enabled devices becomes increasingly common, problems can arise. Specifically, when multiple IPA-enabled devices are located proximate each other (e.g., in the same or adjoining rooms), user voice commands intended for one IPA-enabled device may be received, interpreted, and acted upon by a different IPA-enabled device. For example, a voice command issued in one room to a home automation device configured to control a light switch could also be received and implemented by a similarly configured smart speaker located in an adjoining room, causing an unwanted light to turn on or off. Thus, under some circumstances, conflicts between IPA-enabled devices that are located proximate each other may reduce the convenience and efficiency that would otherwise be afforded by such devices.

Accordingly, improved techniques for executing voice commands in a system that includes multiple IPA-enabled devices would be useful.

SUMMARY

The various embodiments set forth a non-transitory computer-readable medium including instructions that, when executed by one or more processors, configure the one or more processors to perform speech recognition in a multi-device system by performing the steps of receiving a first audio signal that is generated by a first microphone in response to a verbal utterance, and a second audio signal that is generated by a second microphone in response to the verbal utterance, dividing the first audio signal into a first sequence of temporal segments, dividing the second audio signal into a second sequence of temporal segments, comparing a sound energy level associated with a first temporal segment of the first sequence to a sound energy level associated with a first temporal segment of the second sequence, based on the comparing, selecting, as a first temporal segment of a speech recognition audio signal, one of the first temporal segment of the first sequence and the first temporal segment of the second sequence, and transmitting the speech recognition audio signal to a speech recognition application, or performing speech recognition on the speech recognition audio signal.

At least one advantage of the disclosed embodiments is that a user can issue a voice command that is detectable by multiple smart devices, but receive only a single response from a single smart device. A further advantage is that a system of multiple smart devices is able to contextually determine which of the smart devices is expected to execute a voice command, without requiring a user to include specific location information in the voice command.

BRIEF DESCRIPTION OF THE SEVERAL VIEWS OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the various embodiments may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
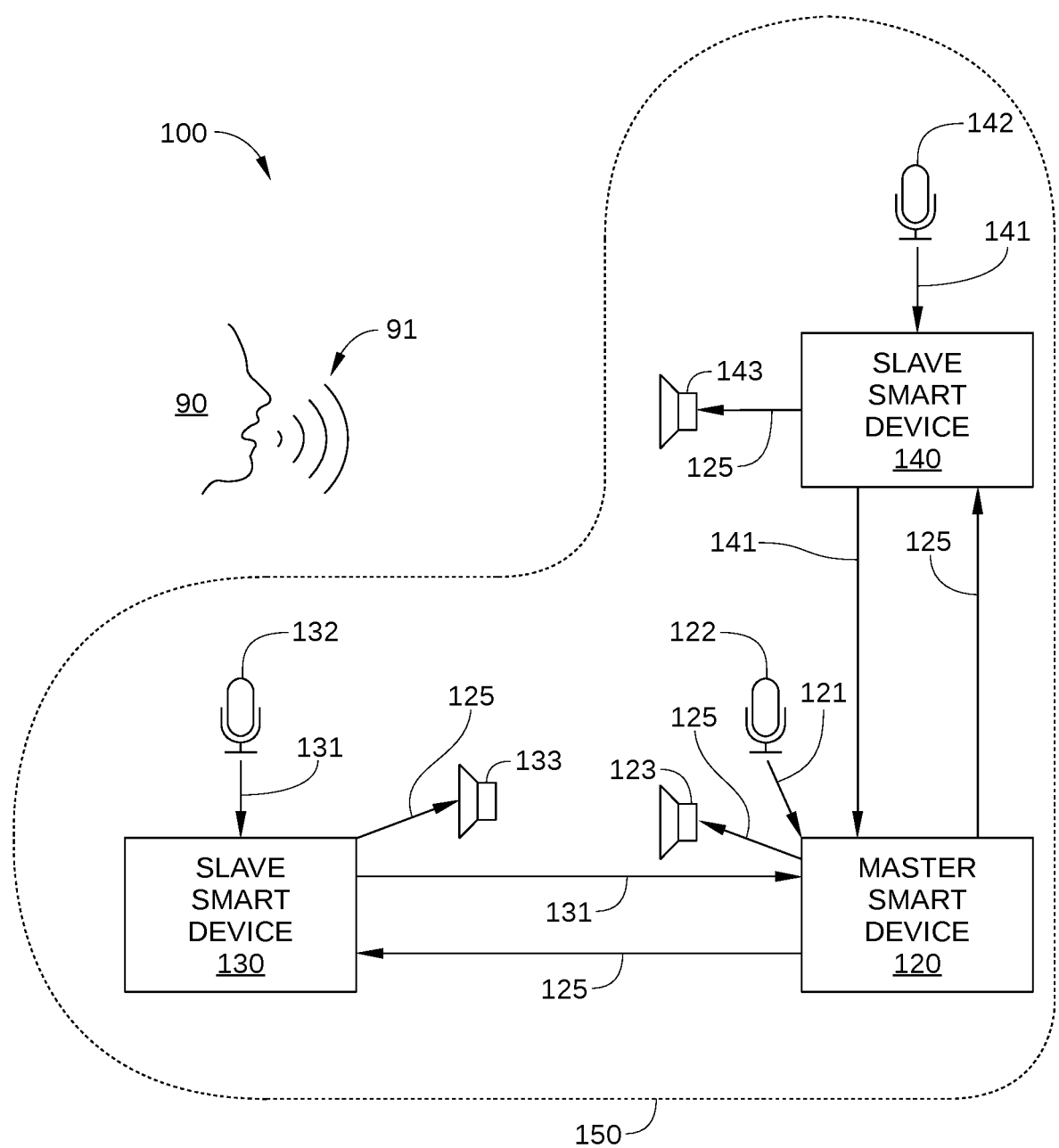
FIG. 1 is a schematic diagram illustrating a multi-device intelligent personal assistant (IPA) system, configured to implement one or more aspects of the various embodiments.

FIG. 1 is a schematic diagram illustrating a multi-device intelligent personal assistant (IPA) system 100, configured to implement one or more aspects of the various embodiments. Multi-device IPA system 100 includes a master smart device 120, a slave smart device 130, and a slave smart device 140, all communicatively connected to each other via communication network 150. Also shown in FIG. 1 is a user 90, who generates a user request via a verbal utterance 91. In some embodiments, multi-device IPA system 100 includes more than two slave smart devices.

Communication network 150 may be any technically feasible type of communications network that allows data to be exchanged between master smart device 120, slave smart device 130, slave smart device 140, and/or other entities or devices, such as a web server or another networked computing device. For example, communication network 150 may include a wide area network (WAN), a local area network (LAN), a wireless (WiFi) network, wireless personal area network (WPAN) (such as a Bluetooth network), and/or the Internet, among others. Thus, in some embodiments, communication network 150 may include one or more additional network devices that are not shown in FIG. 1, such as a WiFi router. In other embodiments, communication network 150 may be limited to master smart device 120, slave smart device 130, and slave smart device 140.

Each of master smart device 120, slave smart device 130, and slave smart device 140 is an IPA-enabled computing device configured to receive and act on certain voice commands from a user. In operation, one or more of master smart device 120, slave smart device 130, and slave smart device 140 detect verbal utterance 91 and convert verbal utterance 91 to a respective audio signal, such as a digital audio signal. Thus, slave smart device 130 generates an audio signal 131 in response to verbal utterance 91, for example via a microphone 132, and transmits audio signal 131 to master smart device 120. Similarly, slave smart device 140 generates an audio signal 141 in response to verbal utterance 91, for example via a microphone 142, and transmits audio signal 141 to master smart device 120. Master smart device 120 also generates an audio signal 121 via a microphone 122 in response to verbal utterance 91, and then constructs a speech recognition audio signal based on portions of audio signal 131, audio signal 141, and/or audio signal 121, as described in greater detail below. The speech recognition audio signal is then transferred to a speech recognition application for evaluation. When a response audio signal 125 is returned by the speech recognition application, master smart device 120 determines which smart device in multi-device IPA system 100 is closest to user 90, and transmits response audio signal 125 to that smart device for conversion into sound energy by an appropriate loudspeaker 123, 133, or 143. Thus, while multiple smart devices in multi-device IPA system 100 may receive verbal utterance 91 that includes a voice command, only a single smart device in multi-device IPA system 100 generates sound associated with the response to the voice command.

Each of master smart device 120, slave smart device 130, and slave smart device 140 may be any stand-alone computing device operable to communicate via communication network 150 and execute an IPA application and applications associated with the IPA application. Examples of computing devices suitable for use as master smart device 120, slave smart device 130, and slave smart device 140 include, without limitation, a smart speaker, a smartphone, a home automation hub, an electronic tablet, a laptop computer, a desktop computer, and the like. Alternatively or additionally, one or more of master smart device 120, slave smart device 130, and/or slave smart device 140 may be a computing device operable to communicate via communication network 150 and incorporated into an electronic device, consumer product, or other apparatus, including, without limitation, a video game console, a set top console, a digital video recorder, a home automation device, and the like. One embodiment of such a computing device is described below in conjunction with FIG. 2.

Figure 2:
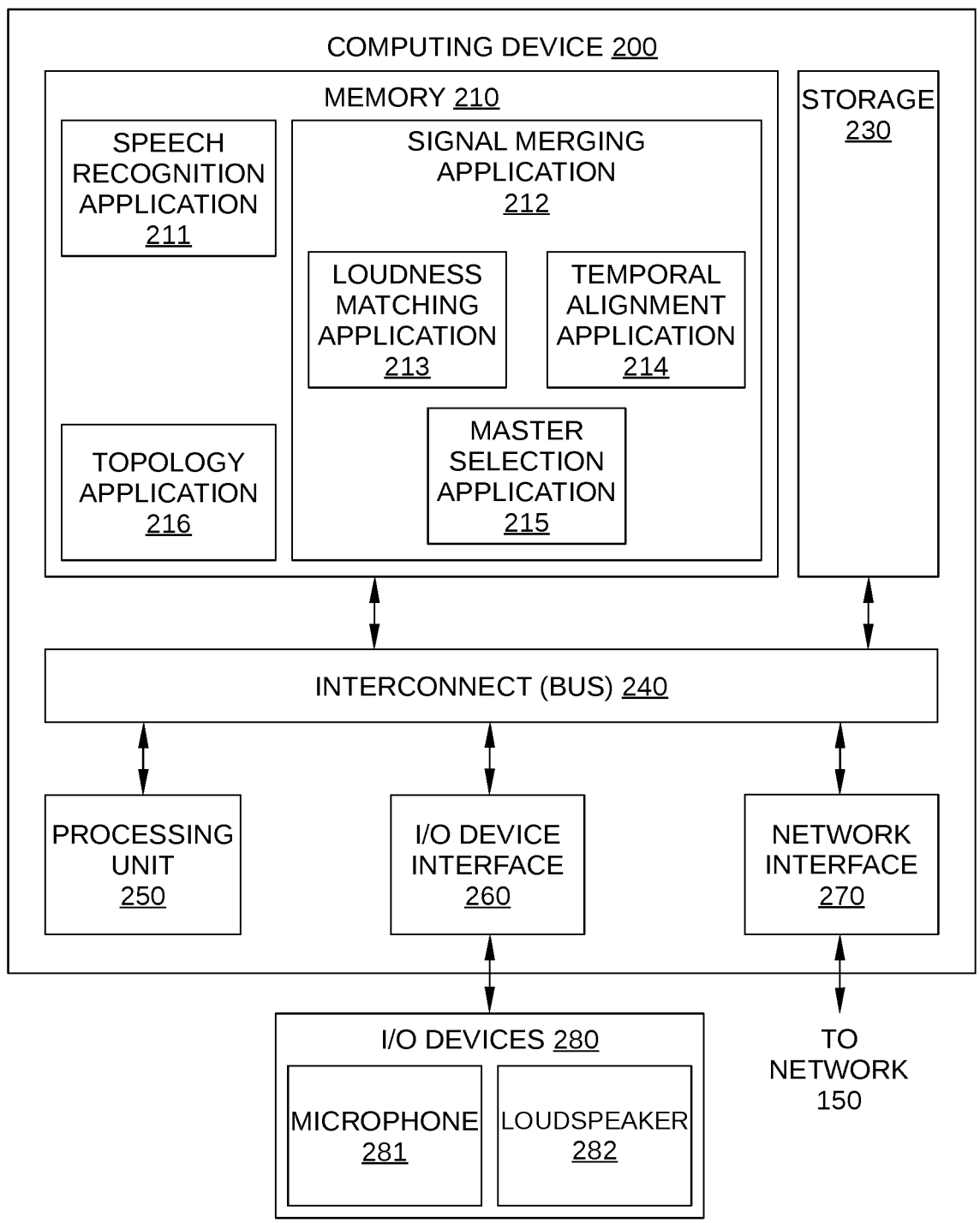
FIG. 2 illustrates a computing device configured to implement one or more aspects of the present disclosure.

FIG. 2 illustrates a computing device 200 configured to implement one or more aspects of the disclosure. Computing device 200 may be employed as master smart device 120, slave smart device 130, and/or slave smart device 140 in multi-device IPA system 100. As such, computing device 200 is configured to execute one or more of a speech recognition program 211, an audio signal merging application 212, and/or a topology application 216, each of which may reside in a memory 210. In some embodiments, audio signal merging application 212 may include one or more of a loudness matching application 213, a temporal alignment application 214, and a master selection application 215. Computing device 200 is further configured to cause sound to be generated by a loudspeaker 282, for example by converting response audio signal 125 (shown in FIG. 1) to sound energy. It is noted that the computing device described herein is illustrative and that any other technically feasible configurations fall within the scope of the present invention.

As shown, computing device 200 includes, without limitation, an interconnect (bus) 240 that connects a processing unit 250, an input/output (I/O) device interface 260 coupled to input/output (I/O) devices 280, memory 210, a storage 230, and a network interface 270. Processing unit 250 may be any suitable processor implemented as a central processing unit (CPU), an application-specific integrated circuit (ASIC), a field programmable gate array (FPGA), any other type of processing unit, or a combination of different processing units, such as a CPU configured to operate in conjunction with a digital signal processor (DSP). For example, in some embodiments, processing unit 250 includes a CPU and a DSP. In general, processing unit 250 may be any technically feasible hardware unit capable of processing data and/or executing software applications, including speech recognition program 211, audio signal merging application 212, loudness matching application 213, temporal alignment application 214, master selection application 215, and/or topology application 216. Further, in the context of this disclosure, the computing elements shown in computing device 200 may correspond to a physical computing system (e.g., a system in a data center) or may be a virtual computing instance executing within a computing cloud. In such embodiments, speech recognition program 211 may be implemented via a virtual computing instance executing within a computing cloud or server.

I/O devices 280 may include devices capable of providing input, such as a keyboard, a mouse, a touch-sensitive screen, a microphone 281 and so forth, as well as devices capable of providing output, such as a loudspeaker 282 and a display screen. The display screen may be a computer monitor, a video display screen, a display apparatus incorporated into a hand held device, or any other technically feasible display screen. Particular instances of microphone 281 in FIG. 1 include microphones 122, 132, and 142, which are configured to convert sound energy, such as verbal utterance 91, into an audio signal, such as audio signals 121, 131, or 141. Particular instances of loudspeaker 282 in FIG. 1 include loudspeakers 123, 133, and 143, which are configured to convert an audio signal, such as response audio signal 125 returned by speech recognition application 211, to sound energy.

I/O devices 280 may include additional devices capable of both receiving input and providing output, such as a touchscreen, a universal serial bus (USB) port, and so forth. Such I/O devices 280 may be configured to receive various types of input from an end-user of computing device 200, and also to provide various types of output to the end-user of computing device 200, such as displayed digital images or digital videos. In some embodiments, one or more of I/O devices 280 are configured to couple computing device 200 to communications network 150.

I/O interface 260 enables communication of I/O devices 280 with processing unit 250. I/O interface generally includes the requisite logic for interpreting addresses corresponding to I/O devices 280 that are generated by processing unit 250. I/O interface 260 may also be configured to implement handshaking between processing unit 250 and I/O devices 280, and/or generate interrupts associated with I/O devices 280. I/O interface 260 may be implemented as any technically feasible CPU, ASIC, FPGA, any other type of processing unit or device.

Network interface 270 is a computer hardware component that connects processing unit 250 to communication network 150. Network interface 270 may be implemented in computing device 200 as a stand-alone card, processor, or other hardware device. In embodiments, in which communication network 150 includes a WiFi network or a WPAN, network interface 270 includes a suitable wireless transceiver. Alternatively or additionally, network interface 270 may be configured with cellular communication capability, satellite telephone communication capability, a wireless WAN communication capability, or other types of communication capabilities that allow for communication with communication network 150 and other computing devices 200 included in multi-device IPA system 100.

Memory 210 may include a random access memory (RAM) module, a flash memory unit, or any other type of memory unit or combination thereof. Processing unit 250, I/O device interface 260, and network interface 270 are configured to read data from and write data to memory 210. Memory 210 includes various software programs that can be executed by processor 250 and application data associated with said software programs, including speech recognition application 211, audio signal merging application 212, loudness matching application 213, temporal alignment application 214, master selection application 215 and/or topology application 216. In the embodiment illustrated in FIG. 2, memory 210 and storage 230 are illustrated as physical components incorporated into computing device 200. In other embodiments, memory 210 and/or storage 230 may be included in a distributed computing environment, such as a computing cloud.

Speech recognition application 211 may be any application configured to convert speech, such as verbal utterance 91 in FIG. 1, to text. In addition, speech recognition application may be configured to serve as a voice interface for one or more separate applications. In some embodiments, speech recognition application 211 is a software application or module that is incorporated into an IPA system associated with computing device 200.

Audio signal merging application 212 is configured to generate a speech recognition audio signal from multiple input audio signals, such as audio signal 121, audio signal 131, or audio signal 141. To that end, audio signal merging application 212 is configured to divide an audio signal into a plurality of sequential temporal segments. In addition, with respect to multiple audio signals that have been divided into sequences of temporal segments, audio signal merging application 212 is configured to compare a temporal segment from each of the multiple audio signals associated with a particular timestamp, select the temporal segment with the best audio signal strength, and use the selected temporal segment to construct a portion of a speech recognition audio signal. By repeating this process for each timestamp associated with the multiple audio signals, audio signal merging application 212 generates a single speech recognition audio signal for use by speech recognition application 211. Thus, the speech recognition audio signal generated for speech recognition application 211 includes the portions of the multiple audio signals having the strongest audio signal strength.

In some embodiments, audio signal merging application 212 includes loudness matching application 213 and/or temporal alignment application 214. Operation of audio signal merging application 212, loudness matching application 213, temporal alignment application 214, and topology application 216 is described in greater detail below.

Master selection application 215 is configured to determine which of the smart devices included in multi-device IPA system 100 operates as the master smart device and which operate as the slave smart devices. In some embodiments, when a new smart device is added to multi-device IPA system 100, such as when an additional IPA-enabled smart device is powered on within communication network 150, master selection application 215 coordinates communication between the various smart devices within multi-device IPA system 100 so that a master smart device is selected. Thus, even when master smart device 120, slave smart device 130, and slave smart device 140 are similar or identical devices, a single master smart device is selected.

Any technically feasible algorithm(s) may be employed in master selection application 215 to select the master smart device. For example, in some embodiments, the smart device in multi-device IPA system 100 that has the greatest computational power is selected as master smart device 120. Alternatively, in some embodiments, the smart device in multi-device IPA system 100 that has the greatest battery charge is selected as master smart device 120. In still other embodiments, the smart device in multi-device IPA system 100 that is the most centrally located is selected as master smart device 120. In such embodiments, a topology of rooms describing a living space that coincides with multi-device IPA system 100 may be employed to decide which smart device is most centrally located. Embodiments of such a topology are described below in conjunction with FIG. 7.

As noted previously, according to embodiments of the disclosure, master smart device 120 is configured to construct a speech recognition audio signal based on portions of audio signal 131, audio signal 141, and/or audio signal 151 (all shown in FIG. 1), and transfer the speech recognition audio signal to a speech recognition application for evaluation and interpretation. Master smart device 120 is further configured to determine which smart device in multi-device IPA system 100 is closest to user 90 and provide that smart device with any response audio signal 125 returned by speech recognition application 211. Consequently, the appropriate smart device in multi-device IPA system 100 provides any forthcoming audio response to user 90. Such embodiments are described below in conjunction with FIGS. 3-5.

Figure 3:
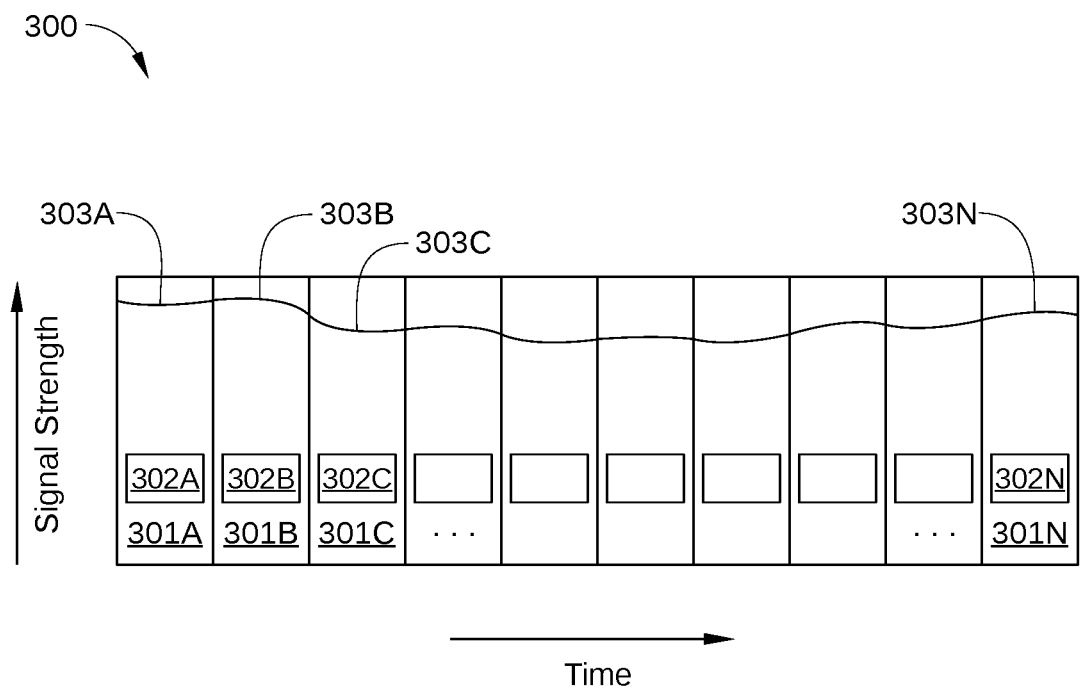
FIG. 3 schematically illustrates an audio signal that is received by a master smart device in the multi-device IPA system of FIG. 1 and processed, according to various embodiments.

FIG. 3 schematically illustrates audio signal 300 that is received by master smart device 120 and processed, according to various embodiments. Audio signal 300 can represent audio signal 121, which is generated by master smart device 120, audio signal 131, which is generated by slave smart device 130, or audio signal 141, which is generated by slave smart device 140. As shown, audio signal 300 is divided into a sequence of temporal segments 301A-301N. Each of temporal segments 301A-301N includes a particular portion of audio data from audio signal 300 associated with a particular time interval, i.e., one of audio signal segment data 303A-303N, respectively. In addition, each of temporal segments 301A-301N includes metadata associated with audio signal 300 and that particular time interval, i.e., segment metadata 302A-302N. For example, temporal segment 301A includes audio signal segment data 303A and segment metadata 302A. Likewise, temporal segment 301B includes audio signal segment data 303B and segment metadata 302B, temporal segment 301C includes audio signal segment data 303C and segment metadata 302C, and so on.

Each of temporal segments 301A-301N, referred to collectively herein as temporal segments 301, includes audio signal data for a unique time interval, where the time interval for each temporal segment 301 is between about 50 milliseconds and about 2 seconds. Very low duration temporal segments 301 generally require greater computational resources, and therefore may be difficult to implement in some configurations of master smart device 120, slave smart device 130, or slave smart device 140. Furthermore, longer duration audio segments 301 can fail to provide sufficient temporal granularity within audio signal 131 for effectively merging temporal segments from different audio signals into a speech recognition audio signal, as described below. Consequently, in some embodiments, the time interval for each temporal segment 301 is between about 100 milliseconds and about 500 milliseconds. Each of audio signal segment data 303A-303N, referred to collectively herein as audio signal segment data 303, has an audio signal strength or sound energy level associated therewith, which is illustrated graphically vs. time as shown.

Segment metadata 302A-302N, referred to collectively herein as segment metadata 302, each include metadata associated with audio signal 300 and a particular temporal segment 303. For example, in some embodiments, an instance of segment metadata 302 associated with a particular temporal segment 301 includes a timestamp or other identifier indicating a time at which audio signal segment data 303 of that temporal segment 301 was generated by a smart device in multi-device IPA system 100. In some embodiments, an instance of segment metadata 302 associated with a particular temporal segment 301 includes information indicating from which smart device in multi-device IPA system 100 the temporal segment 301 originated. Furthermore, in some embodiments, an instance of segment metadata 302 associated with a particular temporal segment 301 includes metadata related to the audio signal segment data 303 included in that temporal segment 301, such as an average audio signal strength over the temporal segment 301, a peak audio signal strength of audio signal segment data within the temporal segment, and the like.

In some embodiments, audio signal 300 is divided into temporal segments 301 by the smart device that generates audio signal 300. In such embodiments, some or all of segment metadata 302 are also generated by the smart device that generates audio signal 300. Alternatively, in some embodiments, audio signal 300 can be divided into temporal segments 301 by master smart device 120 when received from slave smart device 130 or slave device 140. Similarly, in some embodiments, some or all of segment metadata 302 may be generated by master smart device 120 once temporal segments 301 are generated.

Figure 4:
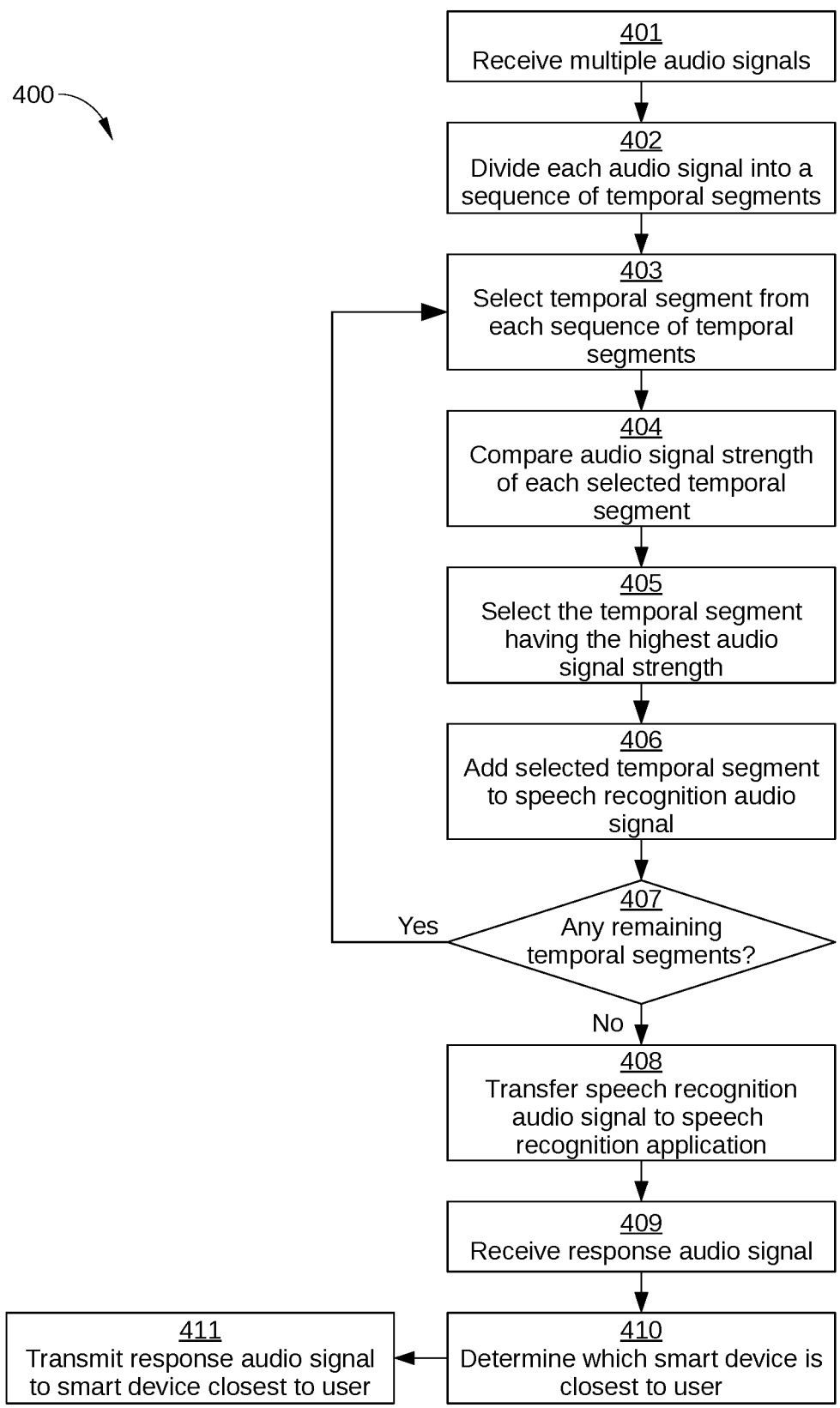
FIG. 4 sets forth a flowchart of method steps for performing speech recognition in a multi-device system, according to various embodiments.

FIG. 4 sets forth a flowchart of method steps for performing speech recognition in a multi-device system, according to various embodiments. FIGS. 5A-D schematically illustrate different stages of the method steps of FIG. 4, according to various embodiments of the disclosure. Although the method steps are described with respect to the systems of FIGS. 1-3, persons skilled in the art will understand that any system configured to perform the method steps, in any order, falls within the scope of the various embodiments.

Figure 5A:
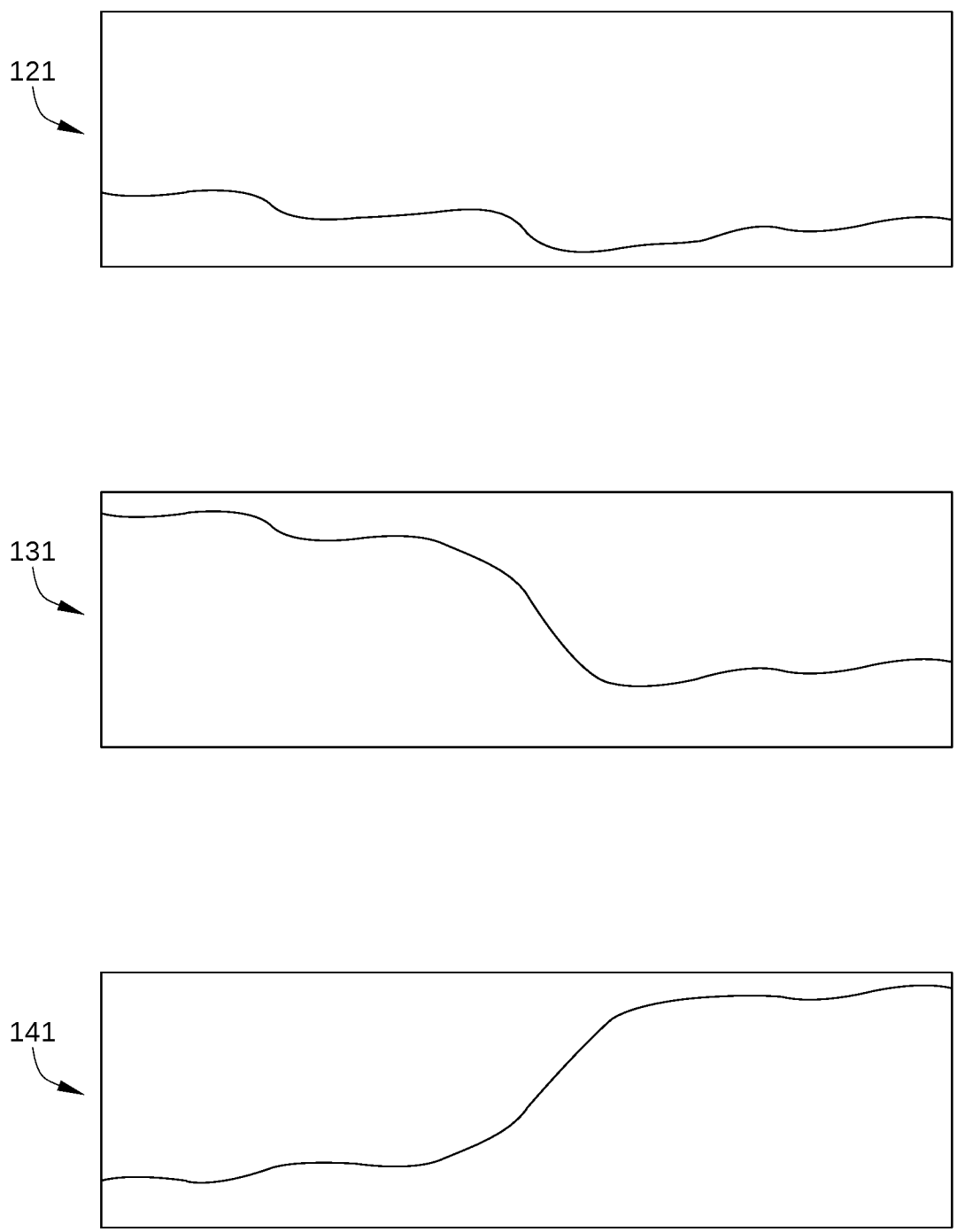
FIGS. 5A-D schematically illustrate different stages of the method steps of FIG. 4, according to various embodiments of the disclosure.

As shown, a method 400 begins at step 401, in which master smart device 120 receives multiple audio signals, one from each smart device included in multi-device IPA system 100. The audio signals are generated in response to verbal utterance 91 from user 90. For example, in one embodiment, master smart device 120 receives audio signal 121 from microphone 122, audio signal 131 from slave smart device 130, and audio signal 141 from slave smart device 140, as shown in FIG. 5A. Because slave smart device 130 is selected to be a slave smart device, when slave smart device 130 receives audio signal 131 from microphone 132, audio signal 131 is transmitted to master smart device 120, rather than being processed by any speech recognition application included locally in slave smart device 130. Similarly, slave smart device 140 transmits audio signal 141 to master smart device 120 rather than processing audio signal 141 locally.

Figure 5B:
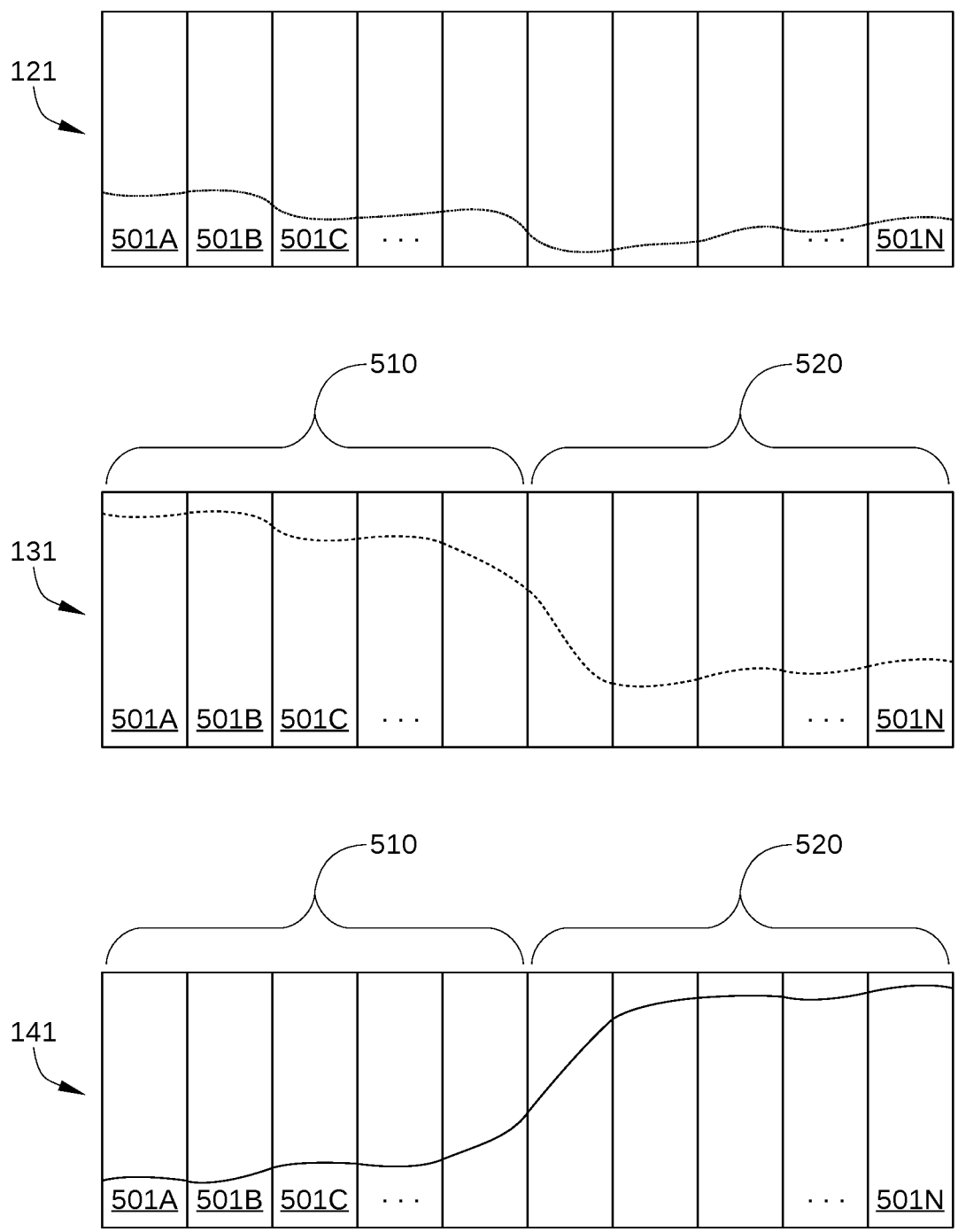

In step 402, master smart device 120 divides the audio signals received in step 401 into a sequence of timestamped temporal segments 501A-501N, as shown in FIG. 5B. It is noted that the relative signal strength of one of the audio signals received in step 401 with respect to the other audio signals can vary throughout temporal segments 501A-501N. For example, audio signal 131 has the strongest audio signal strength in temporal segments 510, whereas audio signal 141 has the strongest audio signal strength in temporal segments 520. Such a change in relative audio signal strength may be a result of a change in location or orientation of user 90 with respect to one or more of master smart device 120, slave smart device 130, or slave device 140. Thus, during the time interval represented by temporal segments 510, user 90 may be proximate or directly facing slave smart device 130, while in the time interval represented by temporal segments 520, user 90 may be more directly facing or closer to slave smart device 140.

In addition to dividing audio signals 121, 131, and 141 into a sequence of temporal segments, in some embodiments master smart device 120 also generates some or all of segment metadata 302 for each temporal segment 501A-

501N of audio signals 121, 131, and 141. In alternative embodiments, the division of audio signals 131 and 141 into temporal segments is performed locally, prior to being transmitted to master smart device 120. In such embodiments, slave smart device 130 divides audio signal 131 into temporal segments 301 and generates segment metadata 302 for each temporal segment 301, while slave smart device 140 divides audio signal 141 into temporal segments 301 and generates segment metadata 302 for each temporal segment 301.

In step 403, master smart device 120 selects a corresponding temporal segment 501 from each audio signal received in step 401. In some embodiments, the temporal segments are selected chronologically, thus, at each iteration of step 403, a later temporal segment 501 is selected from each audio signals 121, 131, and 141. For example, in such embodiments, in the first iteration of step 403, master smart device 120 selects temporal segment 501A from each of audio signals 121, 131, and 141, in the next iteration of step 403 master smart device 120 selects temporal segment 501B from each audio signal, and so on. Corresponding temporal segments 501 from each audio signal can be selected in step 403 based on timestamp. That is, temporal segments in each audio signal that have the same timestamp information are selected together in step 403.

Figure 5C:
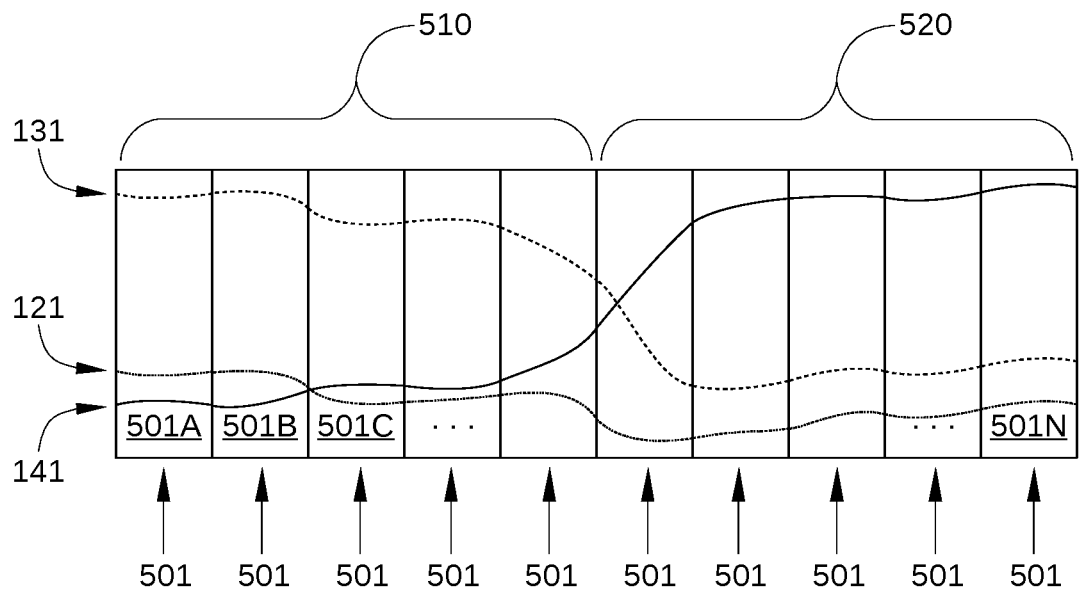

In step 404, master smart device 120 compares an audio signal strength of the temporal segments 501 selected in step 403, as illustrated in FIG. 5C. By way of illustration, FIG. 5C shows the comparison of all temporal segments 501 of audio signals 121, 131, and 141 being compared simultaneously. In practice, master smart device 120 generally compares a single temporal segment 501 from each of audio signals 121, 131, and 141 at each iteration of step 404. For example, in one iteration of step 404, master smart device 120 compares the audio signal strength of temporal segment 501A of audio signal 121 to the audio signal strength of temporal segment 501A of audio signal 131 and temporal segment 501A of audio signal 141. The audio signal strength of temporal segment 501B of each of audio signals 121, 131, and 141 is compared in a subsequent iteration of step 404, and so on.

In some embodiments, the comparison of audio signal strength is based on information included in segment metadata 302 for each temporal segment 501 selected in step 403. In some embodiments, master smart device 120 compares an average audio signal strength for each temporal segment 501. In other embodiments, master smart device 120 compares a peak audio signal strength for each temporal segment 501.

In step 405, master smart device 120 selects the temporal segment 501 having the highest audio signal strength or sound energy level.

Figure 5D:
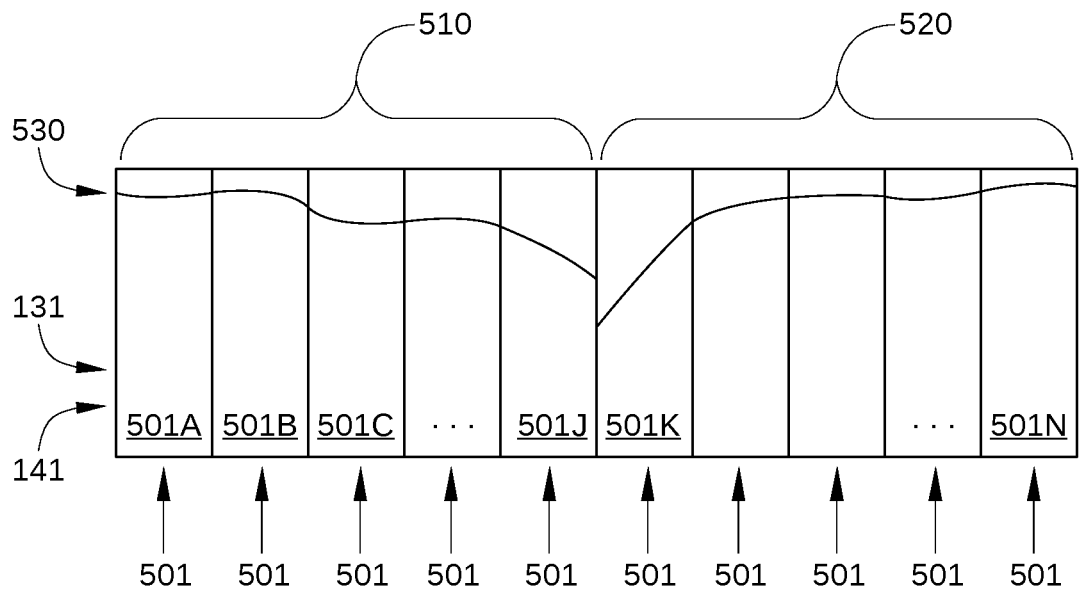

In step 406, master smart device 120 adds the temporal segment 501 selected in step 405 to a speech recognition audio signal 530, as illustrated in FIG. 5D. FIG. 5D shows speech recognition audio signal 530 after method 400 is completed and all temporal segments 531 have been added from audio signals 121, 131, and 141 being compared simultaneously. In practice, master smart device 120 generally adds a single temporal segment 501 from each of audio signals 121, 131, and 141 at each iteration of step 406. For example, in one iteration of step 406, master smart device 120 selects temporal segment 501A of audio signal 131 to speech recognition audio signal 530 as temporal segment 531A. Then, in a subsequent iteration of step 406, master smart device 120 selects temporal segment 501B of audio signal 131 to speech recognition audio signal 530 as temporal segment 531B, and so on. In the embodiment illustrated in FIG. 5D, audio signal 131 has the strongest audio signal strength in temporal segments 510, therefore temporal segments 510 from audio signal 131 are added to speech recognition audio signal 530 during multiple iterations of step 406. Similarly, audio signal 141 has the strongest audio signal strength in temporal segments 520, therefore temporal segments 520 from audio signal 141 are added to speech recognition audio signal 530 during multiple iterations of step 406.

In step 407, master smart device 120 determines whether any temporal segments of the audio signals received in step 401 remain to be processed. If yes, method 400 proceeds back to step 403; if no, method 400 proceeds to step 408.

In step 408, master smart device 120 transfers speech recognition audio signal 530 to speech recognition application 211 for processing and interpretation. In some embodiments, speech recognition application 211 converts speech recognition audio signal 530 into text, then detects voice commands associated with speech recognition application 211 or other applications related to multi-device IPA system 100 that are included in the text. For example, in some embodiments, detected voice commands are implemented by master smart device 120, whereas in other embodiments, the detected voice commands are transmitted to any suitable application executing in master smart device 120 or other computing device communicatively coupled to communication network 150. Generally the detected voice commands may include any suitable commands employed by conventional IPA systems, such as conversational questions or commands.

In step 409, master smart device 120 receives a response audio signal from speech recognition application 211, such as response audio signal 125 in FIG. 1. For example, response audio signal 125 may include a speech-based response to the voice command or commands detected in step 408.

In step 410, master smart device 120 determines which of the smart devices included in multi-device IPA system 100 is closest to user 90. In some embodiments, master smart device 120 determines which smart devices is closest to user 90 based on segment metadata 302. Specifically, the master smart device 120 may determine that the smart device that is closest to user 90 is the smart device from which the last temporal segment 531N of speech recognition audio signal 530 originated.

In step 411, master smart device 120 transmits response audio signal 125 to the smart device determined to be the closest to user 90 in step 410. Thus, the smart device that is located closest to user 90 provides the audible response to voice commands included in verbal utterance 91. Furthermore, no other smart devices in multi-device IPA system 100 provide an audible response. Thus, by implementation of method 400, the confusion to user 90 caused by multiple IPA-enabled devices replying simultaneously to the same verbal command is avoided.

In some situations, discontinuities may be present in the speech recognition audio signal 530 generated in method 400, since temporal segments 501 from multiple sources are combined to form speech recognition audio signal 530. For example, when a temporal segment 501 in speech recognition audio signal 530 from a first source, e.g., audio signal 131, is adjacent to a temporal segment 501 from a second source, e.g., audio signal 141, there may be a significant discontinuity in audio signal strength, as shown in FIG. 5D. Temporal segment 501J in speech recognition audio signal 530 is taken from audio signal 131, and has a higher audio signal strength than temporal segment 501K, which is taken from audio signal 141. Such discontinuities can produce audible ticks that can effect the ability of speech recognition application 211 to recognize verbal commands. According to some embodiments, loudness matching application 213 is configured to smooth such discontinuities, as illustrated in FIGS. 6A-D.

Figure 6A:
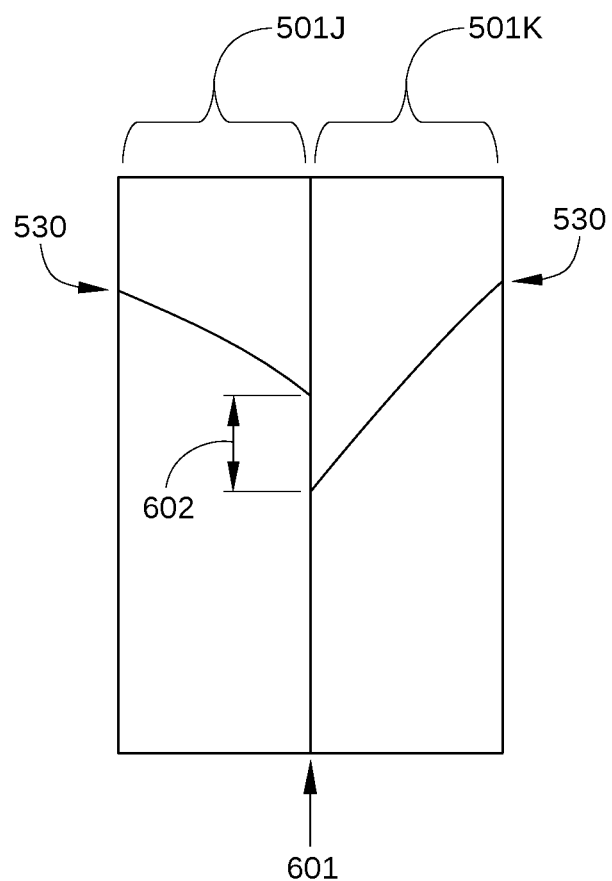
FIG. 6A schematically illustrates temporal segments in a speech recognition audio signal prior to any loudness matching.

FIG. 6A schematically illustrates temporal segment 501J and 501K in speech recognition audio signal 530 prior to any loudness matching. As shown, at a transition time 601 between temporal segment 501J and temporal segment 501K, a loudness discontinuity 602 occurs.

Figure 6B:
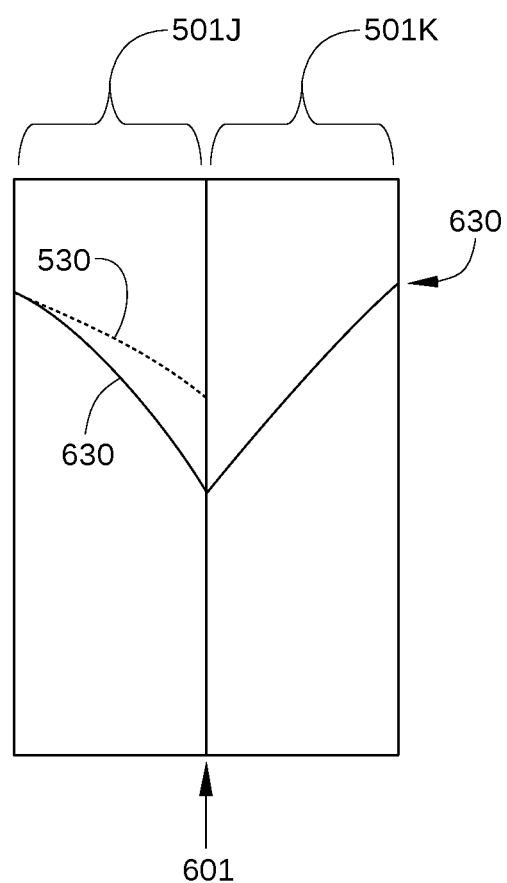
FIG. 6B schematically illustrates the temporal segment of FIG. 6A after a loudness matching application has performed loudness matching on one of the temporal segments, according to an embodiment.

FIG. 6B schematically illustrates temporal segment 501J and 501K after loudness matching application 213 has performed loudness matching on temporal segment 501J, according to an embodiment. Specifically, loudness matching application 213 has reduced the audio signal strength for at least a portion of temporal segment 501J, so that the audio signal level of temporal segment 501J at transition time 601 equals the audio signal level of temporal segment 501K at transition time 601. In this way, an enhanced speech recognition audio signal 630 is generated by loudness matching application 213. In some embodiments, the reduction in audio signal strength can be gradual across some or all of the time interval represented by temporal segment 501J, as shown. The reduction in audio signal strength depicted in FIG. 6B can be readily performed with conventional digital signal processing techniques. Alternatively or additionally, any technically feasible techniques for blending the audio signal associated with temporal segment 501J with the audio signal associated with temporal segment 501K may be employed to audibly smooth the transition between temporal segment 501J and 501K, such as echo-canceling techniques, deconvolution algorithms, and the like.

Figure 6C:
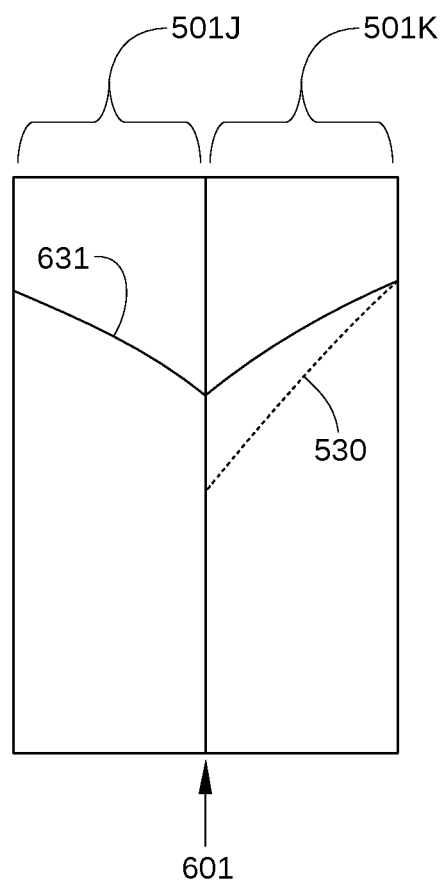
FIG. 6C schematically illustrates the temporal segments of FIG. 6A after a loudness matching application has performed loudness matching on one of the temporal segments, according to another embodiment.

FIG. 6C schematically illustrates temporal segment 501J and 501K after loudness matching application 213 has performed loudness matching on temporal segment 501K, according to another embodiment. Specifically, loudness matching application 213 has increased the audio signal strength for at least a portion of temporal segment 501K, so that the audio signal level of temporal segment 501K at transition time 601 equals the audio signal level of temporal segment 501J at transition time 601. In this way, an enhanced speech recognition audio signal 631 is generated by loudness matching application 213. In some embodiments, the increase in audio signal strength can be gradual across some or all of the time interval represented by temporal segment 501K, as shown. The increase in audio signal strength depicted in FIG. 6C can be readily performed with any of the digital signal processing techniques described above in conjunction with FIG. 6B.

Figure 6D:
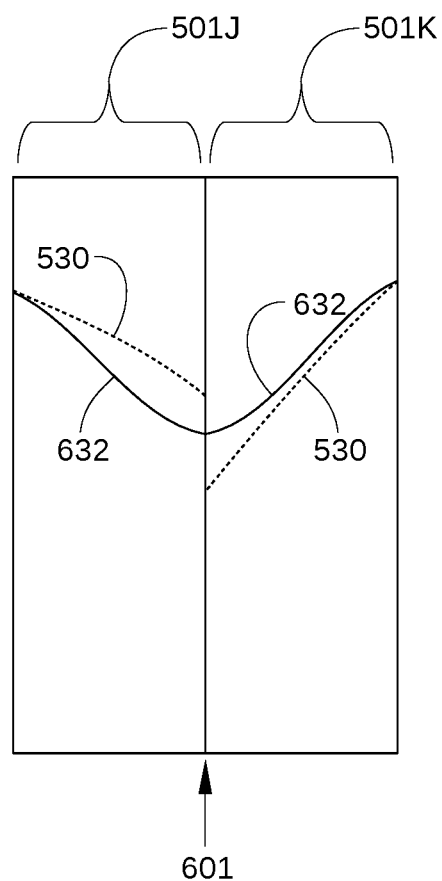
FIG. 6D schematically illustrates the temporal segments of FIG. 6A after a loudness matching application has performed loudness matching on both temporal segments, according to another embodiment.

FIG. 6D schematically illustrates temporal segment 501J and 501K after loudness matching application 213 has performed loudness matching on temporal segment 501J and on temporal segment 501K, according to another embodiment. Specifically, loudness matching application 213 has decreased the audio signal strength for at least a portion of temporal segment 501J and increased the audio signal strength for at least a portion of temporal segment 501K, so that the audio signal level of temporal segment 501K at transition time 601 equals the audio signal level of temporal segment 501J at transition time 601. In this way, an enhanced speech recognition audio signal 632 is generated by loudness matching application 213. Such changes in audio signal strength can be readily performed with any of the digital signal processing techniques described above in conjunction with FIG. 6B.

In some embodiments, a discontinuity in audio signal strength between temporal segment 501J and 501K is addressed by temporal alignment application 214. For example, when minor temporal misalignment is present between the timestamps of one or more of temporal segments 501 associated with one audio signal (e.g., audio signal 131) and the timestamps of one or more of temporal segments 501 associated with another audio signal (e.g., audio signal 141), the waveforms in temporal segment 501J and 501K can be aligned using well-known digital signal processing techniques. In this way, audible discontinuities between audio signals, for example caused by the small delays inherent in differently positioned smart devices, can be minimized or otherwise reduced.

In some embodiments, some or all of the smart devices included in multi-device IPA system are each linked to a specific location associated with communication network 150, such as a particular room in a home or office space. In such embodiments, master smart device 120, slave smart device 130, and slave device 140 are location-aware smart devices. That is, each is associated with a particular room or other location within an over-arching area, such as a living space. Thus, commands received by a particular smart device in multi-device IPA system 100 can be understood by the smart device in a location-aware context, where the smart device is aware of the location of the user, other devices in the living space, and the smart device itself. In such embodiments, topology application 216 is configured to enable a user to associate each smart device in multi-device IPA system 100 with a particular location in a topological representation of the area served by multi-device IPA system 100. One embodiment of such a topological representation is illustrated in FIG. 7.

Figure 7:
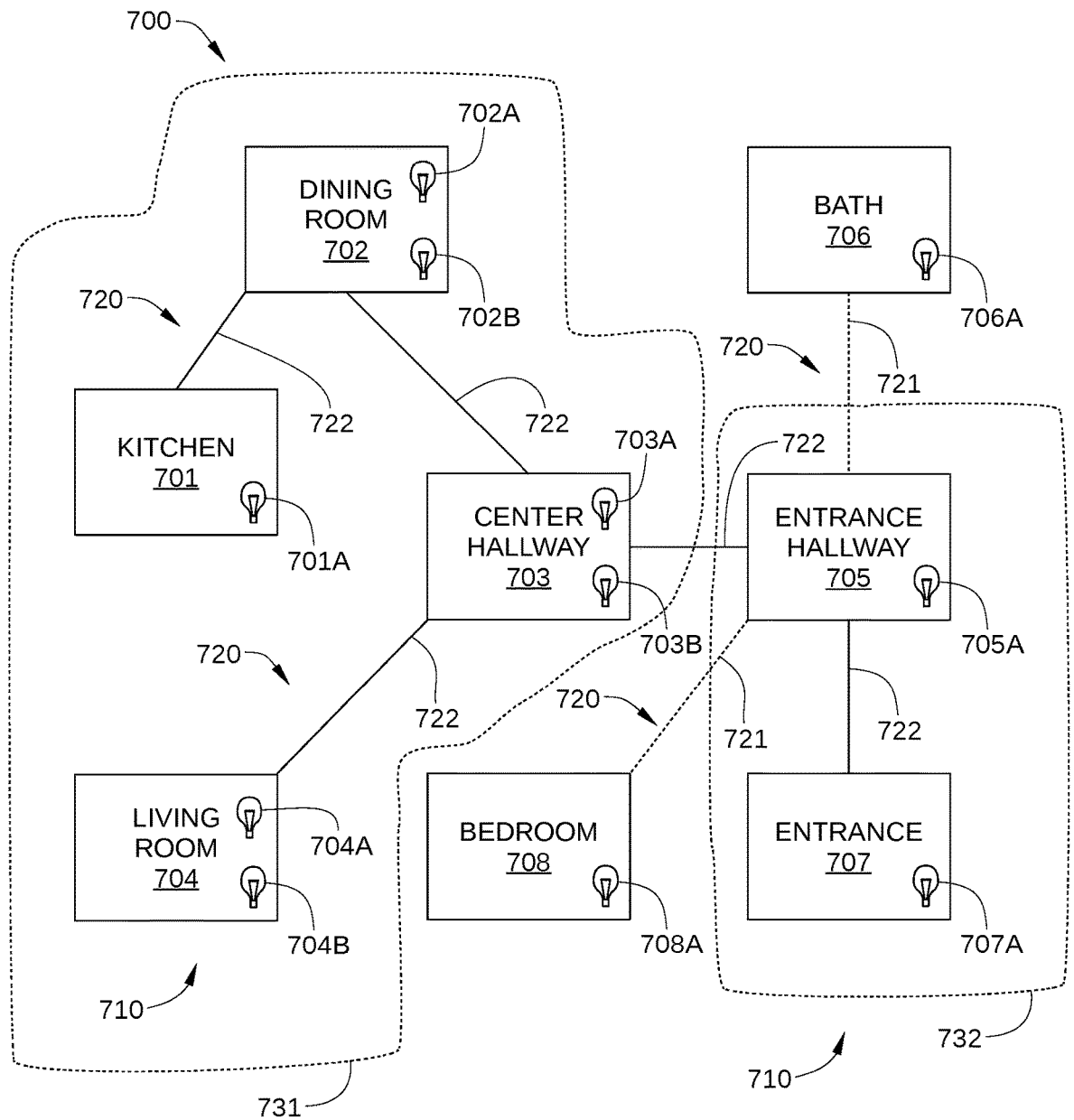
FIG. 7 schematically illustrates a topological representation of an area served by a multi-device IPA system similar to the multi-device IPA system in FIG. 1, according to various embodiments.

FIG. 7 schematically illustrates a topological representation 700 of an area served by a multi-device IPA system similar to multi-device IPA system 100 in FIG. 1, according to various embodiments. Topological representation 700 captures the physical relationships between the various rooms of a living space associated with multi-device IPA system 100. As such, topological representation 700 includes rooms 710, and connections 720 that indicate what access exists between the various rooms 710. In addition, topological representation 700 may also include one or more zones 731 and 732, which each include multiple rooms that are proximate each other. Topological representation 700 is generally input by a user, for example via a graphical user interface provided by topology application 216, and is typically modified whenever a smart device is added to multi-device IPA system 100.

In the embodiment illustrated in FIG. 7, rooms 710 include a kitchen 701, a dining room 702, a center hallway 703, a living room 704, an entrance hallway 705, a bath 706, an entrance 707, and a bedroom 708. Connections 720 include door access connections 721 between certain rooms 710 and open area access connections 722 between certain rooms 710. Thus, connections 720 can indicate what rooms can be a target space for voice control, where rooms connected via open area access connections 722 are considered as possible targets and rooms that are separated from a user by door access connections 721 are not. In addition, topological representation 700 includes locations of smart devices, such as device controllable by voice command. In the embodiment illustrated in FIG. 7, the smart devices in topological representation 700 include lights 701A, 702A, 702B, 703A, 703B, 704A, 704B, 705A, 706A, 707A, and 708A.

Zones 731-733 each include multiple rooms and a unique identifier that can be employed in voice commands. Thus, when zone 731 is defined in topological representation 700 as "family area," a voice command can be directed to the family area that affects all smart devices in any of the rooms included in that zone. For example, a user giving the voice command "turn on lights in the family area" will result in lights 701A, 702A, 702B, 703A, 703B, 704A, and 704B being turned on.

Figure 8:
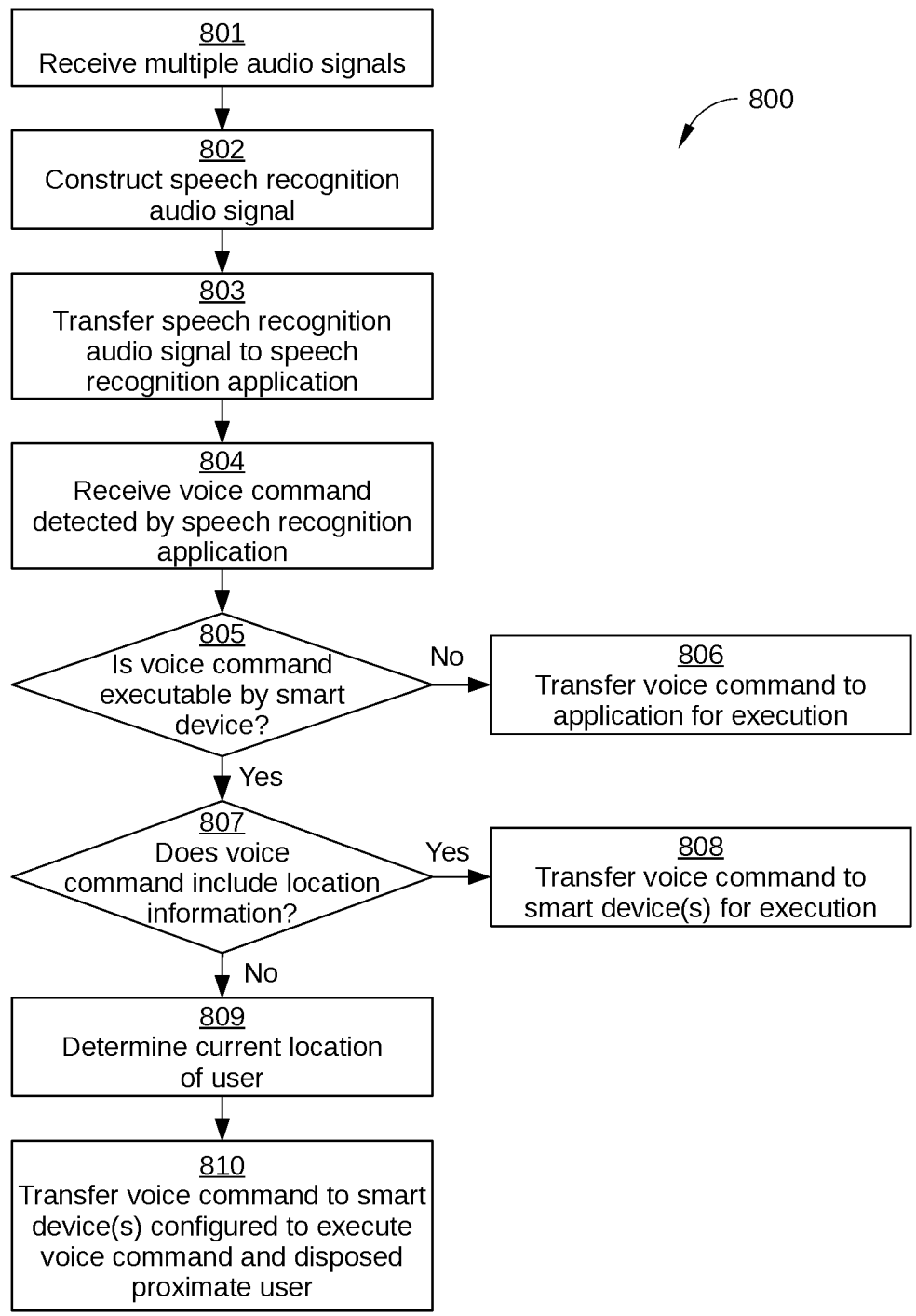
FIG. 8 sets forth a flowchart of method steps for performing speech recognition in a multi-device system, according to various embodiments.

FIG. 8 sets forth a flowchart of method steps for performing speech recognition in a multi-device system, according to various embodiments. Although the method steps are described with respect to the systems of FIGS. 1-3, persons skilled in the art will understand that any system configured to perform the method steps, in any order, falls within the scope of the various embodiments.

As shown, a method 800 begins at step 801, in which a master smart device in a multi-device IPA system that is associated with topological representation 700 receives one or more audio signals. The master smart device receives one such audio signal from each smart device included in the multi-device IPA system that has detected a verbal utterance from a user. For example, the one or more audio signals may be received by the master smart device via a WiFi network or other network similar to communication network 150 in FIG. 1, and are generated in response to a verbal utterance from a user.

In step 802, the master smart device constructs a speech recognition audio signal from the one or more audio signals received in step 801, for example via the above-described method 400.

In step 803, the master smart device transfers the speech recognition audio signal to a speech recognition application, such as speech recognition application 211, for processing and interpretation. In some embodiments, the speech recognition application converts speech recognition audio signal into text, then detects voice commands executable by the multi-device IPA system.

In step 804, the master smart device receives a voice command detected by the speech recognition application, typically in textual format.

In step 805, the master smart device determines whether the voice command received in step 804 is executable by one or more smart devices included in the multi-device IPA system. If no, method 800 proceeds to step 806; if yes, method 800 proceeds to step 807.

In step 806, the master smart device transfers the voice command to the appropriate application for execution.

In step 807, the master smart device determines whether the voice command received in step 804 includes location information indicating which smart device in the multi-device IPA system is intended to execute the voice command. For example, the voice command may include phrases such as "lights in the living room" or "living room lights." If yes, the method proceeds to step 808; if no, the method proceeds to step 809.

In step 808, the master smart device transfers the voice command to one or more smart devices of the multi-device IPA system at the location indicated in the voice command. For example, in an embodiment in which the voice command includes the phrase "lights in the living room," the master smart device transfers the voice command to the smart devices corresponding to lights 704A and 704B in topological representation 700 for execution of the voice command.

In step 809, the master smart device determines the current location of the user based on what device is the closest smart device in the multi-device IPA system to the user. For example, in some embodiments, the master smart device determines that the closest smart device to the user is the smart device from which the last temporal segment of the speech recognition audio signal originated, as set forth in the above-described method 400.

In step 810, the master smart device transfers the voice command to the one or more smart devices that are configured to execute the voice command and are disposed at the current location of the user.

In sum, implementation of method 800 enables a user to employ voice commands that do not include location information, even though the voice command is a location-specific command. Thus, given a suitably configured topological representation of a multi-room space, a user can issue simple voice commands such as "turn on the light" and have the command executed correctly. Due to the location-aware smart devices included in the multi-device IPA system, the location of a smart device or devices intended by a user to execute a certain voice command can be determined contextually, thereby simplifying the voice commands issued by the user.

In sum, various embodiments set forth systems and techniques for constructing a speech recognition audio signal based on portions of multiple audio signals received from multiple smart devices, transferring the speech recognition audio signal to a speech recognition application for evaluation and interpretation, and determining which of the multiple smart devices is closest to a user. A response audio signal returned by the speech recognition application is transferred to the smart device determined to be closest to the user for execution and/or playback. At least one advantage of the disclosed embodiments is that a user can issue a voice command that is detectable by multiple smart devices, but receive only a single response.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The claimed invention is:

1. A non-transitory computer-readable storage medium including instructions that, when executed by one or more processors, configure the one or more processors to perform speech recognition in a multi-device system by performing the steps of:
receiving a first audio signal that is generated by a first microphone in response to a verbal utterance, and a second audio signal that is generated by a second microphone in response to the verbal utterance;
dividing the first audio signal into a first sequence of temporal segments;
dividing the second audio signal into a second sequence of temporal segments;
comparing a sound energy level associated with a first temporal segment of the first sequence to a sound energy level associated with a first temporal segment of the second sequence;
based on the comparing, selecting, as a first temporal segment of a speech recognition audio signal, one of the first temporal segment of the first sequence and the first temporal segment of the second sequence;
based on comparing a sound energy level associated with a final temporal segment of the first sequence to a sound energy level associated with a final temporal segment of the second sequence, determining whether the first microphone or the second microphone is a closest microphone to a user associated with the verbal utterance; and
transmitting the speech recognition audio signal to a speech recognition application, or
performing speech recognition on the speech recognition audio signal.

2. The non-transitory computer-readable storage medium of claim 1, further comprising instructions that, when executed by one or more processors, configure the one or more processors to perform the steps of:
comparing a sound energy level associated with a second temporal segment of the first sequence to a sound energy level associated with a second temporal segment of the second sequence; and
based on comparing the sound energy level associated with the second temporal segment of the first sequence to the sound energy level associated with the second temporal segment of the second sequence, selecting, as a second temporal segment of the speech recognition audio signal, one of the second temporal segment of the first sequence or the second temporal segment of the second sequence.

3. The non-transitory computer-readable storage medium of claim 2, wherein transmitting the speech recognition audio signal to the speech recognition application comprises transmitting the first temporal segment of the speech recognition audio signal and the second temporal segment of the speech recognition audio signal to the speech recognition application.

4. The non-transitory computer-readable storage medium of claim 1, further comprising instructions that, when executed by one or more processors, configure the one or more processors to perform the steps of:
comparing the sound energy level associated with the final temporal segment of the first sequence to the sound energy level associated with the final temporal segment of the second sequence.

5. The non-transitory computer-readable storage medium of claim 4, further comprising instructions that, when executed by one or more processors, configure the one or more processors to perform the steps of:
receiving an audio signal from the speech recognition application, and
causing the audio signal to be played from a device collocated with the closest microphone.

6. The non-transitory computer-readable storage medium of claim 5, wherein causing the audio signal to be played from the device collocated with the closest microphone comprises transmitting the audio signal to the device collocated with the closest microphone.

7. The non-transitory computer-readable storage medium of claim 1, wherein the sound energy level associated with the first temporal segment of the first sequence comprises one of an average sound energy level of the first temporal segment and a peak sound energy level of the first temporal segment of the first sequence, and the sound energy level associated with the first temporal segment of the second sequence comprises one of an average sound energy level of the first temporal segment of the second sequence and a peak sound energy level of the first temporal segment of the second sequence.

8. The non-transitory computer-readable storage medium of claim 1, wherein selecting as the first temporal segment of the speech recognition audio signal one of the first temporal segment of the first sequence or the first temporal segment of the second sequence comprises selecting a temporal segment having a highest sound energy level.

9. The non-transitory computer-readable storage medium of claim 1, further comprising instructions that, when executed by one or more processors, configure the one or more processors to perform the steps of:
   detecting a loudness discontinuity between a second temporal segment of the speech recognition audio signal and a third temporal segment of the speech recognition audio signal; and
   performing a loudness matching process on at least one of the second temporal segment of the speech recognition audio signal and the third temporal segment of the speech recognition audio signal.

10. The non-transitory computer-readable storage medium of claim 9, wherein the second temporal segment of the speech recognition audio signal comprises a temporal segment included in the first audio signal, and the third temporal segment of the speech recognition audio signal comprises a temporal segment included in the second audio signal.

11. A system, comprising:
   a loudspeaker disposed in an reverberant environment;
   a memory storing a speech recognition application and a signal merging application; and
   one or more processors that are coupled to the memory and, when executing the speech recognition application or the signal merging application, are configured to:
   receive a first audio signal that is generated by a first microphone in response to a verbal utterance, and a second audio signal that is generated by a second microphone in response to the verbal utterance;
   divide the first audio signal into a first sequence of temporal segments;
   divide the second audio signal into a second sequence of temporal segments;
   compare a sound energy level associated with a first temporal segment of the first sequence to a sound energy level associated with a first temporal segment of the second sequence;
   based on comparing the sound energy level associated with the first temporal segment of the first sequence to the sound energy level associated with the first temporal segment of the second sequence, select, as a first temporal segment of a speech recognition audio signal, one of the first temporal segment of the first sequence and the first temporal segment of the second sequence;
   based on comparing a sound energy level associated with a final temporal segment of the first sequence to a sound energy level associated with a final temporal segment of the second sequence, determine whether the first microphone or the second microphone is a closest microphone to a user associated with the verbal utterance; and
   transmit the speech recognition audio signal to a speech recognition application, or perform speech recognition on the speech recognition audio signal.

12. The system of claim 11, wherein the sound energy level associated with the first temporal segment of the first sequence comprises one of an average sound energy level of the first temporal segment and a peak sound energy level of the first temporal segment of the first sequence, and the sound energy level associated with the first temporal segment of the second sequence comprises one of an average sound energy level of the first temporal segment of the second sequence and a peak sound energy level of the first temporal segment of the second sequence.

13. The system of claim 11, wherein selecting as the first temporal segment of the speech recognition audio signal one of the first temporal segment of the first sequence or the first temporal segment of the second sequence comprises selecting a temporal segment having a highest sound energy level.

14. The system of claim 11, further comprising:
   detecting a loudness discontinuity between a second temporal segment of the speech recognition audio signal and a third temporal segment of the speech recognition audio signal; and
   performing a loudness matching process on at least one of the second temporal segment of the speech recognition audio signal and the third temporal segment of the speech recognition audio signal.

15. The system of claim 14, wherein the second temporal segment of the speech recognition audio signal comprises a temporal segment included in the first audio signal, and the third temporal segment of the speech recognition audio signal comprises a temporal segment included in the second audio signal.

16. The system of claim 11, further comprising:
   receiving a voice command from the speech recognition application, wherein the voice command does not include location information indicating a smart device that is to execute the voice command;
   determining a location of a smart device that is closest to the user; and
   transferring the voice command to the smart device that is closest to the user.

17. The system of claim 16, wherein determining the location of the smart device comprises consulting a topological representation of an area in which multiple smart devices are located.

18. A method for performing speech recognition in a multi-device system, the method comprising:
   receiving a first audio signal that is generated by a first microphone in response to a verbal utterance, and a second audio signal that is generated by a second microphone in response to the verbal utterance;
   dividing the first audio signal into a first sequence of temporal segments;
   dividing the second audio signal into a second sequence of temporal segments;
   comparing a sound energy level associated with a first temporal segment of the first sequence to a sound energy level associated with a first temporal segment of the second sequence;
   based on the comparing, selecting, as a first temporal segment of a speech recognition audio signal, one of the first temporal segment of the first sequence and the first temporal segment of the second sequence;
   based on comparing a sound energy level associated with a final temporal segment of the first sequence to a sound energy level associated with a final temporal segment of the second sequence, determining whether the first microphone or the second microphone is a closest microphone to a user associated with the verbal utterance; and transmitting the speech recognition audio signal to a speech recognition application, or performing speech recognition on the speech recognition audio signal.

19. The method of claim 18, wherein the sound energy level associated with the first temporal segment of the first sequence comprises one of an average sound energy level of the first temporal segment and a peak sound energy level of the first temporal segment of the first sequence, and the sound energy level associated with the first temporal segment of the second sequence comprises one of an average sound energy level of the first temporal segment of the second sequence and a peak sound energy level of the first temporal segment of the second sequence.

20. The method of claim 18, wherein selecting as the first temporal segment of the speech recognition audio signal one of the first temporal segment of the first sequence or the first temporal segment of the second sequence comprises selecting a temporal segment having a highest sound energy level.

* * * * *